United States Patent

[11] 3,547,453

| | | |
|---|---|---|
| [72] | Inventor | Rudolf Gottschald<br>Osterath, Germany |
| [21] | Appl. No. | 610,617 |
| [22] | Filed | Jan. 20, 1967 |
| [45] | Patented | Dec. 15, 1970 |
| [73] | Assignee | A. Ehrenreich & Cie.<br>Dusseldorf-Oberkassel, Germany |
| [32] | Priority | Jan. 26, 1966 |
| [33] | | Germany |
| [31] | | E 30,926 |

[54] ELASTIC BELLOW PACKINGS FOR UNIVERSALLY MOVABLE JOINTS, AND MORE PARTICULARLY FOR BALL JOINTS
2 Claims, 4 Drawing Figs.

[52] U.S. Cl.................................................... 277/212,
287/90
[51] Int. Cl........................................................ F16j 15/48,
F16j 15/32, F16c 11/06

[50] Field of Search........................................... 277/212F,
162, 186; 287/90A, 90C, 87

[56] References Cited
UNITED STATES PATENTS

| 3,216,754 | 11/1965 | Smith et al.................. | 287/87 |
| 3,135,539 | 6/1964 | Ulderup et al............... | 287/87 |
| 3,269,758 | 8/1966 | Ulderup et al............... | 287/87 |
| 3,310,326 | 3/1967 | Melone....................... | 287/87 |

*Primary Examiner*—Samuel Rothberg
*Attorney*—Arthur Schwartz

ABSTRACT: A ball and socket joint assembly whereby a bellow packing member having a retaining ring thereon is slid over a joint pin until the groove in which the ring is positioned is squeezed between the pin and the retaining ring.

PATENTED DEC 15 1970

3,547,453

Inventor:
Rudolf Gottschald

Attorney:
Arthur Schwartz

ELASTIC BELLOW PACKINGS FOR UNIVERSALLY MOVABLE JOINTS, AND MORE PARTICULARLY FOR BALL JOINTS

My invention relates to an elastic bellow packing for universally movable joints, and more particularly for ball joints, one rim of said packing being fixed to the joint case and the other rim surrounding passage opening of the joint pin which is conically tapered towards the side not facing the joint case, being intended for tightly surrounding the point pin, while said packing is provided with an exterior peripheral groove for receiving a holding ring.

With the packings of the above type which are already known the holding ring is either vulcanized into the peripheral groove or is inserted into the peripheral groove before the bellows are slipped onto the joint pin. In either case the size of the inside diameter of the bellow rim which is surrounded by said ring prior to application of the bellows onto the joint pin while tight contact of the bellow rim to joint pin is merely depending upon squeezing of the elastic material from which the bellows have been made, between the holding ring and the joint pin. Due to this fact different joint pin diameters will require different packings; for one packing will only suffice for levelling comparatively small variations in the diameters of the joint pins. In addition, holding rings which have to be inserted at the bellows subsequently or to be inserted into the exterior groove of the bellow rim respectively are unfavorable in that insertion of the holding rim is comparatively complicated and takes considerable time since the holding rim will have to be squeezed over the groove edge not facing the joint pin head the outside diameter of said edge being greater than the inside diameter of the holding ring. This insertion procedure which is both complicated and takes considerable time is undesirable with a view to uniform an rapid work progress required.

The principal object of the present invention is to provide a packing of the type mentioned above by means of which a wide range of different joint pin diameters may be satisfied resulting in improved close surrounding of the joint pin and which nevertheless may be applied quickly an easily without any effort.

Substantially, this problem has been solved according to the present invention by the fact that the bellow rim intended for surrounding the joint pin and establishing the passage opening of the joint pin has an outside diameter prior to application of the packing onto the joint pin which is smaller than the inside diameter of the holding ring while the inside diameter of the bellow rim has to be widened before the packing is slipped onto the joint pin.

By this measure it will be achieved that for close and nonpositive surrounding of the joint pin the profile elasticity of the material from which the packing has been made will be utilized resulting in satisfying a wide range of diameters of various size while, subsequently, the material elasticity may be employed for squeezing the bellow rim between the holding ring and the joint pin; apart from the fact that, although providing for a holding ring, the packing may be applied without any effort since, prior to application of the packing, the holding ring which may be slipped on over the bellow rim is entering the peripheral groove of the bellow rim due to widening of the bellow rim upon application in which case the bottom of said groove is pressed against the holding ring. According to variations in joint pin diameters holding rings having inside diameters of various size may be used.

The present invention also provides for an embodiment in which the holding ring is established by the exterior rim of a cup ring which may be widened an the bottom rim of which is contacting the joint pin said exterior rim being intended for surrounding the bellow rim passed by the joint pin and, for this purpose, being reduced correspondingly.

The possibility of widening the cup ring may, for instance, be achieved by providing the bottom rim with corresponding slots or angular cuts on the inside. The bottom rim may also have been provided on the inside with tongues which are turning over towards the outside upon application. It may furthermore be possible to produce the cup ring of a widenable material and to block or almost block this widening capacity, for instance, by corresponding dimensioning of the strength in direction of that part forming the holding ring or within that part.

The drawing shows two examples of a construction according to the present invention.

In both examples of a construction according to the present invention the joint case has been identified by 1 and the joint pin by 2. The bellow packing consisting of an elastic material, such as rubber, polyurethane or similar, has been identified by 3. Its rim 4 facing the joint case is, in the embodiments shown, intended to catch into a peripheral groove 5 of the joint case at the opening where the joint pin leaves the same and is engaged in the peripheral groove by means of a ring 6.

Figure 1:
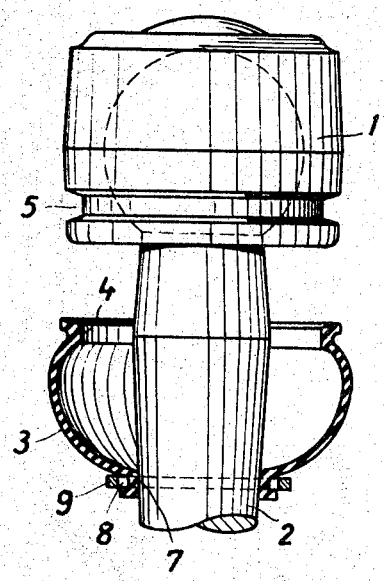
FIG. 1 is an elevational view of a first embodiment prior to insertion of the packing bellows in its position together with a ball joint.
Figure 2:
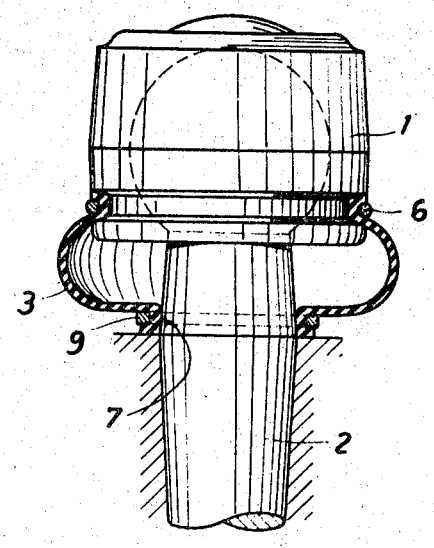
FIG. 2 shows the ball joint after view of the bellow packing.

The rim 7 of the bellow packing establishing the passage opening of the joint pin has an exterior peripheral groove 8 intended to receive a holding ring 9 shown in FIGS. 1 and 2.

As may be seen from the illustrations, the rim 7 of the bellow packing surrounding the joint pin 2 has but a diameter that the rim is widened when the bellow packing is slipped up, i.e. when the bellow packing is displaced towards the joint pin head or the joint case, in which case said rim is spanned against the joint pin due to its profile elasticity. The rigid holding ring 9 shown in FIGS. 1 and 2 has an inside diameter which is greater than the maximum outside diameter of the rim 7 prior to application of the bellow packing to the joint pin. Together with the bellow packing the holding ring 9 is displaced towards the joint pin head or the joint case respectively. Due to the resulting widening of the rim 7, the holding ring enters the groove 8 while the ring is inserted between the holding ring and the joint pin and tightly squeezed so that the rim 7 is surrounding the joint pin due to its profile elasticity and to its material elasticity effect.

Figure 3:
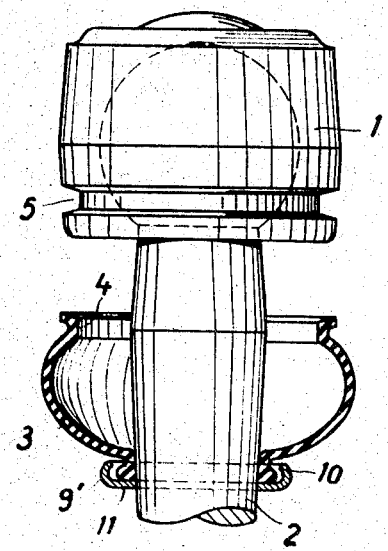
FIG. 3 is an elevational view of a ball joint together with a holding ring for the bellow packing in the form of a cup ring prior to application of the bellow packing in its position with the ball joint.
Figure 4:
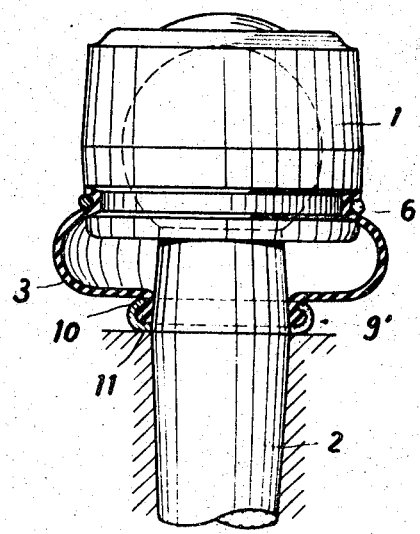
FIG. 4 shows a bellow packing and holding ring according to FIG. 3 after application of the same to the ball joint.

In the embodiments according to FIGS. 3 and 4 the holding ring 9 as been established by the exterior rim of the cup ring 10 which rim has been drawn in. Together with its bottom rim 11 the cup ring may be widened so that the packing effect will be obtained by displacing the packing bellows and the cup ring from the position shown in FIG. 3 towards the joint case into the position shown in FIG. 4.

I claim:
1. A ball and socket joint including:
   a. a housing;
   b. a ball member within said housing;
   c. a joint pin having one end attached to said ball member and the other end extending outwardly from an opening in one end of said housing, a portion of said pin being tapered away from a maximum diameter and extending outwardly of said opening in said housing, the improvement comprising;
   d. a bellow packing having two openings forming a wide annular rim secured to said housing and a relatively smaller annular rim secured to said joint pin, said smaller rim extending along said joint pin in a direction away from said housing and forming an external peripheral groove;
   e. a retaining ring positioned radially of and adjacent said groove;
   f. the outer diameter of said groove in its free unsecured position being substantially smaller than the inside diameter of said retaining ring
   g. said bellow packing being of an elastic material;
   h. the inner diameter of said smaller rim being smaller than the maximum diameter of said tapered pin; and i. the inner diameter of said smaller rim together with the outer diameter of said groove expanding when said smaller rim of said bellow packing and said retaining ring is simultaneously pushed from its free unsecured position to said maximum diameter of said joint pin, whereby said groove and smaller rim expands until it is squeezed between said maximum diameter of said joint pin and said retaining ring.

2. A ball and socket joint as defined in claim 1 wherein said ring is cup-shaped having an inwardly bent upper portion in said groove.